United States Patent [19]
Spauszus et al.

[11] 3,764,782
[45] Oct. 9, 1973

[54] TAXI METER WITH ELECTRONIC FARE COMPUTER

[75] Inventors: Siegfried Spauszus, Villingen; Manfred Fichter, Weiler; Heinz Kelch, Buchenberg, all of Germany

[73] Assignee: Kienzle Apparate GmbH, Villingen, Germany

[22] Filed: June 16, 1972

[21] Appl. No.: 263,430

[30] Foreign Application Priority Data
June 24, 1971 Germany.................. P 21 31 272.1

[52] U.S. Cl. ...... 235/92 TC, 235/92 DM, 235/92 R, 235/92 DN, 235/92 SH, 235/30 R
[51] Int. Cl. .......................................... G07b 13/00
[58] Field of Search ..................... 235/30 R, 92 DN, 235/92 TC, 92 DM, 92 CP, 92 SH, 92 DE

[56] References Cited
UNITED STATES PATENTS
3,512,706  5/1970  Bruce-Sanders .................. 235/30 R
3,666,928  5/1972  Burke et al. ..................... 235/92 DE
3,084,285  4/1963  Bell et al. ......................... 235/92 CP
2,997,234  8/1961  Hughes ........................... 235/92 DM
3,518,660  6/1970  Nicklas et al. ............... 340/347 DD Primary Examiner—Maynard R. Wilbur
Assistant Examiner—Joseph M. Thesz, Jr.
Attorney—Michael S. Striker

[57] ABSTRACT

In a taxi meter having an electronic calculating part serving to calculate the fare on the basis of time and distance such calculating part furnishes a sequence of first pulses each representing a fare increment equal to the selectable number of monetary units. The sequence of first pulses is multiplied in a presettable manner with the fare increment to provide adequate indication by fare indicating means. Basic fare setting means are provided to deliver a pulse at the beginning of each trip, which is also multiplied in accordance with monetary value of basic fare for indication.

6 Claims, 1 Drawing Figure

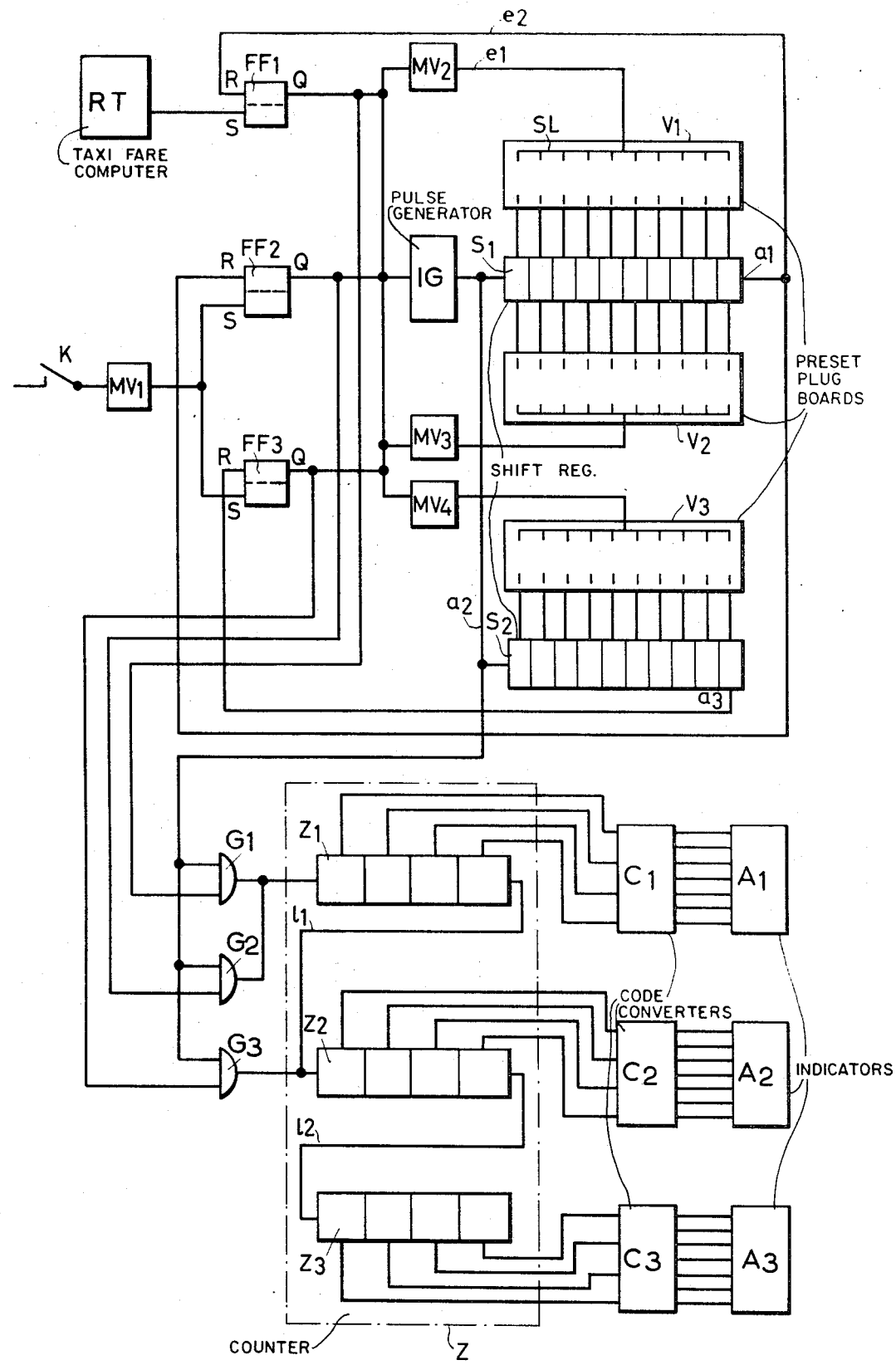

TAXI METER WITH ELECTRONIC FARE COMPUTER

BACKGROUND OF THE INVENTION

This invention relates to electronic taxi meters. Specifically, it relates to such taxi meters as for example described in German Pat. No. 1,259,129. In this known taxi meter, the fare is determined both by a timing circuit which furnishes a sequence of pulses indicative of waiting time and a further sequence of pulses which generates pulses indicative of the distance travelled. In the known taxi meter, that sequence of the above-described sequences of pulses is selected for fare indication which has the higher frequency. The pulses in the selected sequence of pulses are then counted and a visual indication furnished of the so-counted pulses. This visual indication of course is the fare.

The electronic taxi meter described in the above-identified German patent uses mechanical counters which are advanced via relays by the pulses generated in the computer.

In the known mechanical taxi meters, each pulse which advances the mechanical counter is not necessarily equivalent to a single unit of the particular monetary system. For example, it is possible that when the taxi meter is first activated an initial fare of for example 60 cents is set. Fare increments thereafter may be in steps of not one cent, but for example 5 cents. Thus the drum carrying the lowest indicators, that is the cents place, would be marked not in steps of "1," "2," etc., but rather alternately "5" and "0." Thus every other step of the drum carrying the lowest place value must result in an advance of the next higher place value. Specifically, each transition from "5" to "0" results in an advance of the second counting decade. Of course other fare increments could equally readily be selected. In mechanical taxi meters a change in the fare increment represents no particular difficulty, since the fare indication is furnished by indicator bands which may be pasted on to the indicator drums and which furnish the correct monetary indication. In such mechanical meters, a change in the taxi fare increments thus presents no particular difficulty, except that the number of steps of the lowest place for which the next higher place must be advanced has to be adjusted. In the mechanical meters this is of course a gearing or a cam adjustment, for example for a drum having ten steps per revolution and carrying only the indications "5" and "0." The next higher indicator drum would have to be advanced five steps per revolution of the lower indicator drum.

Indication of the base fare, that is the fare which is to be indicated immediately upon activation of the taxi meter, also presents no difficulties in the mechanical meters. The initial indicator position is simply the position in which the base fare is being indicated. Thus if the taxi meter is switched from "free" to "occupied" then the fare indicated is not "0.00" but rather the base fare, which may for example be "0.65".

Some difficulties arise if the above-described mechanical indicating means are to be replaced by electronic indicating means. This is particularly true when the taxi meter is to be a universal taxi meter, that is readily adjustable for different tariffs in different countries, cities, and for different taxi companies. Specifically, electronic indicators cannot as readily be changed to advance in the steps comprising an arbitrary number of monetary units.

SUMMARY OF THE INVENTION

It is an object of the present invention to furnish an electronic taxi meter which receives pulses each representing a fare increment and furnishes, in response thereto, a fare indication in steps of any desired number of monetary units.

It is a further object of the present invention to furnish a taxi meter of the above-described type, wherein a base fare may be selectively set.

The present invention is thus a fare indicator arrangement which receives a sequence of first pulses each representing a fare increment and furnishes, in response thereto, a visual indication of the total fare in steps of a selected number of monetary units for each of said first pulses. The present invention comprises pulse multiplier means which furnish a selectable plurality of second pulses in response to each of said first pulses, said selectable plurality of second pulses corresponding in number to said selected number of monetary units in each of said fare increments. Counter means are connected to said pulse multiplier means for counting said second pulses and furnishing a counter output signal corresponding to the number of so-counted second pulses. Finally, electronic fare indicator means are connected to said counter means for furnishing a visual indication of said counter output signal.

Further comprised in the present invention are externally operable initial fare setting means connected to the input of the pulse multiplier means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a circuit diagram of the present invention.

DESCRIPTION OF THE PREFERRED EMBODIMENT

A preferred embodiment of the present invention will now be described with reference to the drawing.

In the preferred embodiment of the drawing, the assumption is made that the base fare will constitute a two-place number, that is it may for example be 65 cents. Of course any other initial fare may also be used, for example a single place only may be affected or else even a three place initial fare would be possible.

In the drawing, an electronic counter Z has three decade stages, $Z_1$, $Z_2$ and $Z_3$. Each of the decades is a four-stage binary-coded decimal stage. The carry from decade $Z_1$ is applied via a line $l_1$ to decade stage $Z_2$, while the carry from stage $Z_2$ is applied to stage $Z_3$ via line $l_2$. Each of the decade stages thus contains a counting signal in binary-coded decimal form which represents the number of pulses counted by that particular stage. Each of the stages has four outputs which in turn are connected to four inputs of a corresponding code converter, $C_1$, $C_2$ and $C_3$, respectively. These code converters each furnish at their output an indication of the counting signal in the decade in the form required for the particular indicator used. For example if the electronic indicators $A1$, $A2$ and $A3$, each of which is connected to the output of the corresponding code converter $C_1 C_2$ and $C_3$, are Nixie tubes, then a selective energization of one of 10 lines is required for each code combination stored in the corresponding decade stage. In this case, each of the code converters would be a converter from a binary coded decimal to a straight decimal representation. If seven segment indicating elements are used, then a conversion from a binary coded decimal to a "7" repre-sentation would be used. Any of the newer type of indicating elements, such as liquid crystal indicator elements may also be utilized. The particular type of code conversion and indication is not a subject of the present invention.

In accordance with the present invention, a shift register $S1$ is associated with the decade counting stage $Z_1$, while a shift register $S2$ is associated with decade counting stage $Z_2$. Shift register $S1$ has 10 stages. Presetting means, in this case two presetting means $V_1$ and $V_2$ are associated with shift register $S1$, while presetting means $V_3$ are associated with shift register $S2$. The presetting means may for example comprise printed circuit plates which have a single input and ten outputs and may be plugably connected with shift registers $S1$ and $S2$. The input line $SL$ of the presetting means $V_1$ may have a jumper connection which may be a soldered connection, to any one of the stages of shift register $S1$, so that a pulse applied at the input to line $SL$ serves to preset register $S_1$ to any desired stage, that is any desired stage will then show the value "1." Presetting means $V_1$ are associated with the pulse furnishing means which furnish the sequence of first pulses each representing a fare increment. These pulse furnishing means are designated by letters $RT$ in the drawing and are preferably the electronic fare calculating means of the taxi meter. The output of pulse furnishing means $RT$ is connected to the $S$ input of a flp-flop $FF1$ whose output $Q$ is connected to the input of a monostable multivibrator $MV_2$. The output of monostable multivibrator $MV_2$ is connected to line $SL$ via a line $e_1$. As soon as a first pulse appears at the output of unit $RT$, flip-flop $FF1$ is set, and a "1" output at $Q$ flips the monostable multivibrator $MV_2$ into its unstable state. This in turn causes a pulse to be applied to line $SL$ via line $e_1$. This pulse presets shift register $S_1$ to the value determined by the above-mentioned jumper connection. Further, the signal appearing at the $Q$ output of flip-flop $FF1$ is applied to pulse generator means $IG$ which now furnishes second pulses continually to shift register $S_1$. If for example the presetting means $V_1$ were set to preset shift register $S_1$ to the fifth place, then five additional pulses from pulse generator $IG$ will shift through the upper stages of shift register $S_1$ and will cause an overflow at output $a_1$ upon application of the fifth pulse. This overflow signal at output $a_1$ is applied via a line $e_2$ to the reset input $R$ of flip-flop $FF1$. This causes the "1" signal at the $Q$ output to disappear. Thus each of the first pulses supplied by unit $RT$ is converted to five second pulses, namely pulses at the output of pulse generator $IG$. These five pulses are applied via a line $a_2$ to one input of AND-gate $G_1$. As long as flip-flop $FF1$ is set, that is as long as a "1" appears at its $Q$ output, the other input of AND-gate $G_1$ also has a "1" applied thereto. A pulse therefore appears at the output of AND-gate $G_1$ for each pulse furnished by pulse generator means $IG$ as long as flip-flop $FF1$ is set. These pulses are counted in the counter $Z$. Thus counting stage $Z_1$ is advanced for five units for each pulse furnished by unit $RT$. Of course any carry from stage $Z_1$ is, as stated above, applied to stage $Z_2$. As soon as shift register $S_1$ overflows the flip-flop $FF1$ is reset and AND-gate $G_1$ blocks. No further pulses appear at the input of counting stage $Z_1$. In the above-described arrangement, it was assumed that the number of pulses furnished by the pulse generator $IG$ in response to each of the received first pulses affects only one decimal place. It is of course entirely possible by supplying suitable presetting means for shift register $S_2$, to let the number of pulses furnished by pulse generator $IG$ in response to each pulse generated by unit $RT$ affect two decimal places. It is seen that pulse generator $IG$, with its associated shift register $S_1$ and including the presetting means $V_1$, as well as flip-flop $FF1$ and monostable vibrator $MV_2$ constitute pulse multiplier means.

A contact $K$ serves to enter the base fare onto the meter upon activation. This contact is activated only once for each fare. Specifically, it is closed at the beginning of each trip. The contact $K$ serves to set monostable multivibrator $MV_1$ to the unstable state when closed. This in turn causes a "1" to be applied to the set input $S$ of flip-flops $FF2$ and $FF3$. A "1" signal thus appears at the $Q$ outputs of flip-flops $FF2$ and $FF3$. These "1" signals at the $Q$ outputs are applied first to the input of pulse generator $IG$ causing this pulse generator to furnish second pulses to the input of shift register $S_1$ as well as to the input of shift register $S_2$. Presetting means $V_2$ and $V_3$ are connected respectively to shift registers $S_1$ and $S_2$. The "1" signals at the $Q$ outputs of flip-flops $FF2$ and $FF3$ are used to preset shift registers $S_1$ and $S_2$ via monostable multivibrators $MV_3$ and $MV_4$, respectively. If for example the base fare is to be 65 cents, shift register $S_1$ is preset so that its fifth stage has a "1" signal, while shift register $S_2$ is set so that its fourth stage has a "1." The $Q$ outputs of flip-flops $FF2$ and $FF3$ respectively, are applied to the second inputs of AND-gates $G_2$ and $G_3$ respectively. Thus as long as flip-flops $FF2$ and $FF3$ are set, one input of AND-gates $G_1$ and $G_2$ is active. Pulses furnished by pulse generator $IG$ then proceed to switch shift registers $S_1$ and $S_2$ step by step until the fifth pulse in shift register $S_1$ and the sixth pulse in shift register $S_2$ cause overflow signals to appear in lines $a_1$ and $a_3$ respectively. The pulse on line $a_1$ is used to reset flip-flop $FF2$, while the pulse on line $a_3$ is used to reset flip-flop $FF3$. The pulses furnished by pulse generator $IG$, prior to the reception of the "1" signals on line $a_1$ and $a_3$ respectively were applied to decade counter stages $Z_1$ and $Z_2$ through AND-gates $G_2$ and $G_3$ respectively. AND-gate $G_2$ was conductive for the reception of five pulses at the output of pulse generator $IG$, while AND-gate $G_3$ was conductive for the reception of six such pulses. Thus decade $Z_1$ was advanced by a count of five, while decade $Z_2$ was advanced by a count of six. The correct base fare has thus been stored and is indicated on indicators $A_1$ and $A_2$.

While the invention has been illustrated and described as embodied in a specific type of pulse multiplier means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended

We claim:

1. In a taximeter having externally operable initial fare setting means and a pulse furnishing means furnishing a sequence of first pulses each representing a fare increment above said initial fare, a fare indicator arrangement for furnishing a visual indication of the total fare in steps of a selected number of monitary units for each of said fare increments, comprising, in combination, pulse multiplier means connected to said pulse furnishing means, for furnishing a selectable plurality of second pulses in response to each of said first pulses, said selectable plurality of second pulses corresponding in number to said selected number of monitary units in each of said fare increments, said pulse multiplier means comprising pulse generator means, first and second shift register means, and presetting means for independently presetting said first and second shift register means in correspondence to said selected number of monitary units; counter means connected to said pulse multiplier means for counting said second pulses and furnishing a counter output signal corresponding to the number of so-counted second pulses, said counter means comprising a first and second decade counting stage respectively associated with said first and second shift register means; and electrical fare indicator means connected to said counter means for furnishing a visual indication of said counter output signal.

2. In a taximeter having externally operable initial fare setting means and pulse furnishing means furnishing a sequence of first pulses each representing a fare increment, a fare indicator arrangement for furnishing a visual indication of the total fare including a selectable base fare and additional fare in steps of a selected number of monitary units for each of said fare increments, comprising, in combination, pulse generator means for furnishing a sequence of second pulses when activated; first means for activating said pulse generator means to furnish a selectable first number of second pulses corresponding to said selectable initial fare in response to operation of said externally operable initial fare setting means; second means for activating said pulse generator means to furnish a selectable second number of pulses corresponding to said selected number of monitary units for each of said fare increments, in response to each of said first pulses; counter means connected to said first and second means for counting said first and second number of second pulses and furnishing a corresponding counter output signal; and electrical fare indicator means connected to said counter means for furnishing a visual indication of said counter output signal.

3. A taximeter as set forth in claim 2, wherein said first means for activating said pulse generator means comprise first and second shift register means each having a plurality of shift register stages and having, respectively, a first and second shift register output; means for activating said pulse generator means and for shifting a pulse through a selectable number of said plurality of stages in each of said first and second shift register means upon operation of said externally operable initial fare setting means, under control of said second pulses, in such a manner that a shift register output signal appears at said first and second shift register outputs respectively following a number of second pulses corresponding to said selectable number of stages in said first and second shift register means; and means deactivating said pulse generator means in response to the last-created one of said first and second shift register output signals.

4. A taximeter as set forth in claim 3, wherein said counter means comprise a first decade counting stage and a second decade counting stage; further comprising first gating means for enabling said first decade counting stage to count said second pulses from operation of said externally operable initial fare setting means until receipt of said first shift register output signal, and second gating means connected to said second decade counting stage for enabling said second decade counting stage for counting said second pulses from operation of said externally operable initial fare setting means until receipt of said second shift register output signal.

5. A taximeter as set forth in claim 2, further comprising shift register means having a plurality of shift register stages and a shift register output; and wherein said second means for activating said pulse generator means to furnish a selectable second number of pulses in response to each of said first pulses comprise means for shifting a pulse through a selectable number of said shift register stages in response to each of said first pulses and under control of said second pulses in such a manner that a shift register output signal appears at said shift register output following a number of second pulses equal to said selectable second number; and means for activating said pulse generator means in response to each of said first pulses and deactivating said pulse generator means upon receipt of said shift register output signal.

6. A taximeter as set forth in claim 3, wherein said second means comprise means for shifting a pulse through a second selectable number of stages corresponding to said selectable number of second pulses in response to each of said first pulses and under control of said second pulses; means activating said pulse generator means in response to each of said first pulses; and means deactivating said pulse generator means in response to said first register output signal.

* * * * *